United States Patent
Keyes, IV

[15] 3,662,170
[45] May 9, 1972

[54] METHOD AND APPARATUS FOR MEASURING THE THICKNESS MOISTURE PROFILE OF FIBROUS WEBS

[72] Inventor: Marion A. Keyes, IV, South Beloit, Ill.
[73] Assignee: Beloit Corporation, Beloit, Wis.
[22] Filed: May 21, 1970
[21] Appl. No.: 39,356

[52] U.S. Cl. ...................................250/83.3 H, 250/83.3 D
[51] Int. Cl. ...........................................................G01t 1/16
[58] Field of Search.............................250/83.3 H, 83.3 D

[56] References Cited

UNITED STATES PATENTS

| | | |
|---|---|---|
| 2,855,518 | 10/1958 | Foley et al......................250/83.3 D X |
| 3,478,210 | 11/1969 | Janacek........................250/83.3 D X |
| 3,530,296 | 9/1970 | Lehtinen et al................250/83.3 D X |
| 3,228,282 | 1/1966 | Barker, Jr. .....................250/83.3 D X |
| 2,897,371 | 7/1959 | Hasler............................250/83.3 D X |
| 3,150,264 | 9/1964 | Ehlert..............................250/83.3 H |

Primary Examiner—James W. Lawrence
Assistant Examiner—Davis L. Willis
Attorney—Dirk J. Veneman, John S. Munday and Gerald A. Mathews

[57] ABSTRACT

A method and apparatus therefore for measuring the "Z" direction moisture profile in fibrous webs by the use of a pair of backscatter type gauges mounted in operable relationship with a fibrous web and adapted to transmit a signal in proportion to moisture in the web, such that measurement of the moisture from each side of the web permits distance averaging of the moisture to obtain a "Z" direction or thickness moisture profile.

6 Claims, 2 Drawing Figures

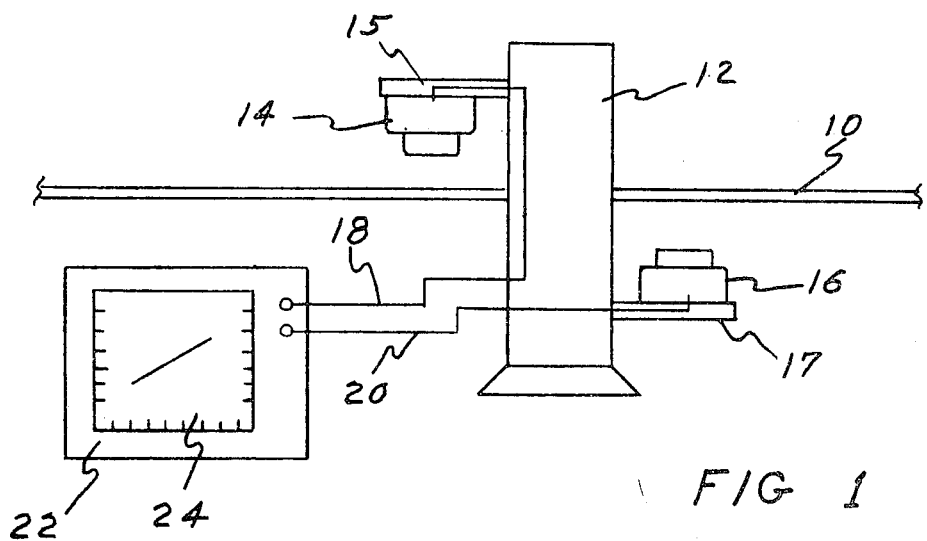
FIG 1
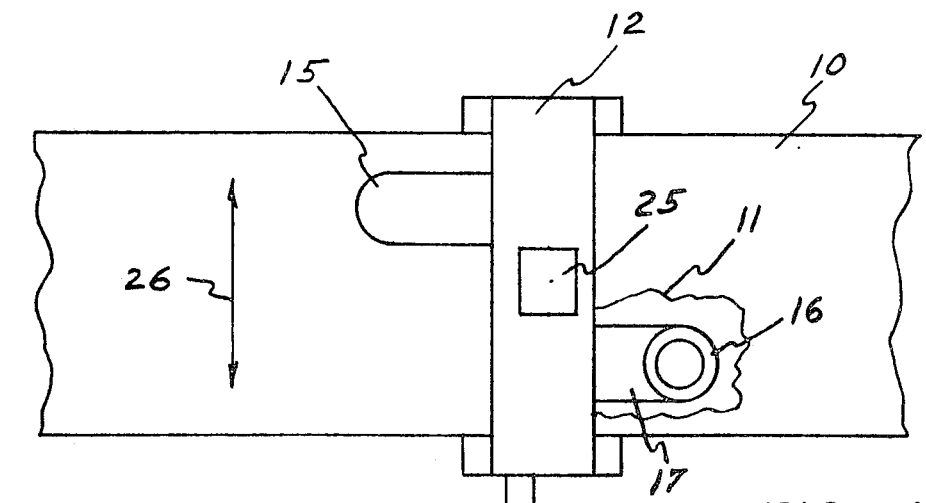
FIG 2
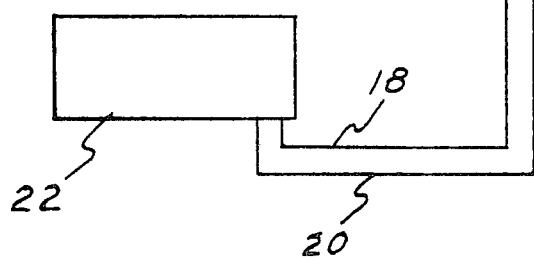
MARION A. KEYES IV
INVENTOR

METHOD AND APPARATUS FOR MEASURING THE THICKNESS MOISTURE PROFILE OF FIBROUS WEBS

BACKGROUND OF THE INVENTION

The measurement of the moisture content of fibrous webs such as paper has long posed a problem for the various industries in which fibrous webs are manufactured. For a long time, the only method available was to sample the paper and perform time consuming experiments to determine the moisture in the web. In the case of paper machines operating at a speed greater than 3,000 feet per minute and having a width greater than 30 feet, substantial quantities of the paper are produced each minute, and in those instances when the moisture content is not optimum for the formation of commercially acceptable grades, a substantial waste is effected.

A number of methods have been adapted by the various industries manufacturing fibrous webs, which for the purpose of this disclosure will be generally referred to as paper webs, and some of these means have gained wide acceptance. In lighter grades of paper, many devices are acceptable for use as measuring aids to determine the moisture of the web as it passes a certain point. As the thickness of the paper or other fibrous web becomes more significant, however, the prior art systems for measuring the moisture through the "Z" direction or thickness of the sheet become less and less effective. Moreover, due to the desire for a uniform product, those devices which actually contact the web oftentimes cause more harm than good.

Some prior art methods for measuring the moisture of webs at a particular point in their manufacture rely on the use of a backscatter type gauges which in essence are devices which send in one or more signals of a particular frequency and receive the reflected wave on its return. Depending upon the type of device, modification of the signal or wavelength occurs, depending upon the amount of moisture in the web. In the instance of relatively thick webs, where the "Z" direction is significant, most of the wavelengths do not penetrate deep enough to measure the entire moisture content. Moreover, those wavelengths which do penetrate are not directed back to the receiving portion of the gauge but are dissipated in the web.

It is, accordingly, an object of this invention to provide a method for measuring the moisture profile of the web as accurately as possible. A more specific object is to provide a means for overcoming the inability of backscatter gauges to penetrate a web of significant thickness.

It has now been discovered that the moisture profile in the "Z" direction of a fibrous web may be measured. Basically, the method comprises transmitting a first signal in proportion to the moisture in the web by means of a first backscatter gauge means mounted in operable relationship to one side of the web while simultaneously transmitting a second signal in the same manner from a second backscatter gauge mounted in operable relationship on the other side of the web. By comparing the two signals, the distance average permits determination of the "Z" direction moisture profile.

By the term, "distance averaging," it is meant that the two readings of the respective top and bottom moisture meters are utilized to obtain a straight line moisture profile from the lower reading to the higher reading. Since the gauges do penetrate to some degree, although the sensitivity drops off as the thickness increases, the data results in the straight line moisture profile ranging from the lower value to the higher value.

In preferred embodiments, the backscatter gauge means generate infrared wavelengths capable of effecting resonant absorption by water. Such a device generates at least two infrared wavelengths, one of which causes a resonant absorption effect on water molecules.

In another preferred embodiment, it is desirous to cause the two backscatter gauges to traverse the width of the web to obtain a more representative reading.

Any backscatter gauge means may be employed in the present invention. Basically, the devices send one or more wavelength signals in a direction aimed at the web itself. The web and the attendant moisture cause the wavelength to react depending upon the amount of water present in the web.

One particularly suitable backscatter gauge useful in the present invention is manufactured by the General Electric Company and sold under the trademark INFRAMIKE II. In this device, a wavelength of 1.94 microns is directed to the sample, that wavelength being in the resonant frequency band and therefore absorbed by water in the sample. A second wavelength of 1.80 microns is also directed to the sample. This wavelength is outside the resonant absorption band of the measuring wavelength and is therefore relatively unchanged regardless of the amount of moisture present in the sample. Since these two wavelengths are close, other variables such as the amount of filler, the particular type of fiber, et cetera, will effect the two wavelengths in an equal manner.

To demonstrate the decreasing efficiency of such a backscatter type gauge as the thickness of the web increases, a number of experiments were performed wherein 39-pound bond paper sheets of predetermined uniform moisture were evaluated. With one sheet, the gauge registered a reading of 5.3. As the number of sheets increased, the gauge reading naturally increased, but it is to be noted that the increase dropped off significantly as thickness progressed. When two sheets of the 39-pound bond paper sheets were employed the reading was 7.4, while with three sheets and four sheets, the readings were 8.1 and 8.3 respectively. Thus it can be seen that the first one-fourth of the paper produced 63.8 percent of the reading while the last one-fourth of the thickness produced only 2.4 percent of the reading.

For a more complete understanding of the concepts of the present invention, reference is hereby made to the drawings, in which:

FIG. 1 shows a schematic side view of the present invention; and

FIG. 2 shows a partially cutaway top schematic view of the present invention.

In the drawings, a web of fibers 10 is passing from left to right in the drawings. A stand 12 is positioned around the web 10 either in a "C" shape or an "O" shape so as to give a top and bottom support for the gauges hereinafter described. Mounted above the web 10 is a backscatter gauge 14 supported by bracket 15 while on the bottom of the sheet 10, a second gauge 16 is supported by bracket 17. The gauges 14 and 16 are in operable relationship with the web 10 and are adapted to measure the moisture in the web. Signals transmitted by the gauges are passed through lines 18 and 20 to a receiver 22 which may if desirable have an output screen 24 to show the relative readings of the gauges 14 and 16.

To determine the moisture across the entire width of the web 10, a motor 25 may be provided as shown in FIG. 2 to move the brackets 15 and 17 in the direction shown by the arrow 26. Thus the gauges 14 and 16 will traverse the entire width of the sheet and permit measurement of any variation in the moisture across the width of the web.

It is, of course, entirely possible and even desirable in some cases to adjust the drying rate of either or both sides of the web to modify the moisture profile. In point of fact, the drying process itself can be monitored using the measurement system of this invention to control the relative drying rates of each side of the web, either in a fixed ratio or in a fixed difference in moisture content. In some cases, it may be desirable to maintain the two sides of the web at equal moisture, while in other cases, differing moisture values will be desirable. The present moisture system is most advantageously employed in situations where the web has a tendency to curl, whether through equal drying rates applied to paper of nonuniform moisture profile or from varying drying rates effecting a uniform moisture. Control systems using the data provided by the present invention may e provided to adjust the drying rate of either or both sides of the web either independently or in conjunction with the drying rate of the other side.

Having thus described the invention, what I claim is:

1. An apparatus for measuring the thickness direction moisture profile in fibrous webs comprising:
   a first backscatter gauge means mounted on one side of said web and adapted to transmit energy into said web and produce a first signal proportional to the moisture in said web;
   a second backscatter gauge means mounted on the other side of said web and adapted to transmit energy into said web and produce a second signal proportional to the moisture in said web;
   a frame mounting said first gauge in operable relationship on said one side of said web and mounting said second gauge in operable relationship with said other side of said web; and
   indicator means operably connected to each of said first and said second gauge means and receiving said first and second signals therefrom and including means for producing a straight line characteristic of moisture versus thickness of said web on said indicator means so that the moisture at any distance from the surface of the web can be determined.

2. The apparatus of claim 1 wherein said backscatter gauge means generate infrared wavelengths, one of which is capable of effecting resonant absorption by water.

3. The apparatus of claim 1 wherein said frame means further includes means for traversing said gauge means across the width of said web.

4. A method for measuring the thickness direction moisture profile in fibrous webs, comprising:
   producing a first signal in proportion to the moisture in said web by means of a first backscatter gauge means mounted in operable relationship on one side of said web;
   producing a second signal in proportion to the moisture in said web by means of a second backscatter gauge means mounted in operable relationship on the other side of said web; and
   producing a linear distance versus thickness characteristic from said first signal and said second signal to determine said thickness direction moisture profile.

5. The method of claim 4 wherein said gauge means traverses the width of said web during operation thereof.

6. The method of claim 4 wherein said signal generated by said backscatter gauge means is derived by comparison of the intensities of two received infrared wavelengths, one of which causes resonant absorption effect on water molecules.

* * * * *